United States Patent
Monga et al.

(10) Patent No.: US 8,331,662 B2
(45) Date of Patent: Dec. 11, 2012

(54) IMAGING DEVICE COLOR CHARACTERIZATION INCLUDING COLOR LOOK-UP TABLE CONSTRUCTION VIA TENSOR DECOMPOSITION

(75) Inventors: Vishal Monga, Webster, NY (US); Zhigang Fan, New York, NY (US)

(73) Assignee: Xerox Corporation, Norwalk, CT (US)

( * ) Notice: Subject to any disclaimer, the term of this patent is extended or adjusted under 35 U.S.C. 154(b) by 965 days.

(21) Appl. No.: 12/356,865

(22) Filed: Jan. 21, 2009

(65) Prior Publication Data

US 2010/0183220 A1 Jul. 22, 2010

(51) Int. Cl.
*G06K 9/00* (2006.01)
*G06K 9/34* (2006.01)

(52) U.S. Cl. .................................................. 382/165

(58) Field of Classification Search .................. 382/162, 382/164, 165, 167; 358/1.9, 2.1, 3.23, 504, 358/518; 348/414.1, 417, 418, 422; 345/419, 345/426, 473, 621, 630; 703/2; 708/400; 709/224

See application file for complete search history.

(56) References Cited

U.S. PATENT DOCUMENTS

| | | | |
|---|---|---|---|
| 5,469,267 A | 11/1995 | Wang | |
| 5,748,330 A | 5/1998 | Wang et al. | |
| 5,854,882 A | 12/1998 | Wang | |
| 6,266,157 B1 | 7/2001 | Fan et al. | |
| 6,435,654 B1 | 8/2002 | Wang et al. | |
| 7,355,752 B2 | 4/2008 | Sharma et al. | |
| 7,693,299 B2* | 4/2010 | Vasilescu et al. | 382/100 |
| 7,724,258 B2* | 5/2010 | Ebert et al. | 345/473 |
| 7,884,820 B2* | 2/2011 | Zhou et al. | 345/426 |
| 2008/0147763 A1* | 6/2008 | Levin | 708/400 |
| 2008/0218802 A1 | 9/2008 | Monga et al. | |
| 2009/0161127 A1* | 6/2009 | Schweid et al. | 358/1.9 |
| 2010/0183220 A1* | 7/2010 | Monga et al. | 382/165 |
| 2011/0055379 A1* | 3/2011 | Lin et al. | 709/224 |

OTHER PUBLICATIONS

Roger Horn & Charles Johnson, *Matrix Analysis*, Cambridge University Press, 1990 ISBN-10: 0521386322 and ISBN-13: 978-0521386326.

Hershman, R.A., "Foundations of the PARAFAC Procedure: Models and Conditions for an "Explanatory" Multimodal Factor Analysis", UCLA Working aPpers in Phonetics, Dec. 1970.

Tucker, L. R., "Some mathematical notes of three mode factor analysis" Psychometrika, 1966.

Friedlander, Michael P. and Hatz, Kathrin, "Computing Non-negative Tensor Factorizations", Department of Computer Science Technical Report TR-2006-21, Oct. 2006, University of British Columbia.

* cited by examiner

*Primary Examiner* — Amir Alavi
(74) *Attorney, Agent, or Firm* — Fay Sharpe LLP

(57) ABSTRACT

A model-based method and apparatus for characterizing the performance of a printing device comprising printing a target set of patches with the device and measuring device response when the target is set; compiling a LUT from the target set and measured response; and representing the LUT as a tensor. Tensor decomposition/parallel factor analysis is employed for compacting the tensor representation of the LUT.

14 Claims, 4 Drawing Sheets

IMAGING DEVICE COLOR CHARACTERIZATION INCLUDING COLOR LOOK-UP TABLE CONSTRUCTION VIA TENSOR DECOMPOSITION

TECHNICAL FIELD

The presently disclosed embodiments are directed to color printing and display systems; and especially color characterization of such systems.

BACKGROUND

In today's business and scientific world, color has become essential as a component of communication. Color facilitates the sharing of knowledge and ideas. Companies involved in the development of digital color print engines are continuously looking for ways to improve the total image quality of their products. One of the elements that affects image quality is the ability to consistently produce the same quality image output on a printer from one day to another, from one week to the next, month after month. Colors on a printer tend to drift over time due to ink/toner variations, temperature fluctuations, type of media used, environment, etc. There has been a long felt commercial need for efficiently maintaining print color predictability, particularly as electronic marketing has placed more importance on the accurate representation of merchandise in illustrative print or display media.

Color printing characterization is a crucial task in color management. The characterization process essentially establishes a relationship between device dependent, e.g. printer CMY, and device independent, e.g. CIELAB values. Several color management tasks such as derivation of ICC profiles, color transforms for calibration, etc. benefit from an accurate mathematical characterization of the physical device. For color printers, characterization is an expensive process involving large numbers of patch measurements and subsequent computation to derive satisfactorily accurate color lookup-tables (LUTs).

Color printer characterization is the process of deriving a mathematical transform which relates printer color CMY(K) to its corresponding device independent representation, e.g. spectral color, CIELAB, etc. The forward characterization transform defines the response of the device to a known input thus describing the color characteristics of the device. The inverse characterization transform compensates for these characteristics and determines the input to the device that is required to obtain a desired response. For the printers hence, a CMY(K)→CIELAB mapping represents a forward characterization transform while the CIELAB→CMY(K) map is an inverse transform. Herein the characterization color transform will be used to refer unambiguously to the forward transform; suitable inversion methods can be used to derive the corresponding inverse transform. The characterization transform is of immense value in many color management tasks such as derivation of ICC profiles for the printer, printer calibration, color control, etc.

To ensure accurate color reproduction for printers, characterization and calibration processes are required. The characterization procedure is often performed in-factory to create machine profiles, while the calibration procedure, which updates the profiles, may be performed in-factory by the manufacturers, or at the customer-site by users. During printer characterization and calibration, color patches are printed and measured, and the machine characteristics are determined by comparing the desired outputs and the actual measured data. In order to precisely measure the color covering the entire printer gamut, the conventional characterization and calibration processes apply a large number of color patches. The number of patches increases drastically if calibrations for multiple media, UCR/GCR strategies, and/or halftone schemes are required.

As the number of color patches is a decisive factor for characterization/calibration cost and time needed, several different methods have been proposed to reduce the number of color patches. One of such approaches is to replace the multi-dimensional (M>=3) LUT by two-dimensional look-up tables instead. Because the two dimensional LUTs are by construction smaller than three or four dimensional LUTs for example, a patch reduction is obtained but at the cost of color accuracy. For example, a multi-dimensional matrix representation of the LUT, can be approximated by decomposition of the multi-dimensional matrix into smaller matrices. In a Principal Component Analysis (PCA) based approach, the color mapping function is modeled as a linear combination of a set of eigen functions. The method may drastically reduce the patches required during calibration, but its characterization process is far more complicated and still needs patches proportional to the number of nodes in the multi-dimensional LUT.

In a radically different approach Wang et al. propose a halftone independent binary printer model to obtain characterization LUTs. S. Wang, et al., U.S. Pat. No. 5,469,267, U.S. Pat. No. 5,748,330, U.S. Pat. No. 5,854,882, U.S. Pat. No. 6,266,157, and U.S. Pat. No. 6,435,654. This approach has a powerful advantage of not repeating patch measurements as a function of halftone. However, its accuracy in predicting measured color needs improvement.

It would be advantageous, and thus there is a need, to interpret multi-dimensional LUTs as tensors and apply tensor decompositions such as parallel-factor analysis to obtain compact representations of LUTs. From a mathematical viewpoint, tensor decompositions naturally unearth structure in multi-dimensional LUTs which is otherwise hard to predict. Hence, whenever a compact representation of a multi-dimensional LUT/tensor is possible via parallel factors it is equivalently possible to derive/represent the LUT with reduced effort in the sense of storage, computation and/or measurement.

DETAILED DESCRIPTION

The subject embodiments relate to representing look-up tables for characterizing a color device such as a printer or other imaging devices, as tensors and then employing tensor decompositions such as parallel factor analysis methods to obtain compact representations of the LUTs. Tensors are N-way arrays or higher-dimensional generalization of matrices. Employing tensor decompositions is analogous to prior known matrix decomposition techniques having a similar objective of compacting LUT representations.

More particularly, the subject embodiments comprise first, adapting tensors to represent an n-dimensional lattice to real number map which typically comprises a multi-dimensional color look-up table, and second, using parallel factor analysis on the LUT tensors to unearth structure in the LUTs leading to methods that can derive the LUT with reduced effort, i.e., reduce storage, computation and/or measurements in the printing device processor means.

Figure 1:
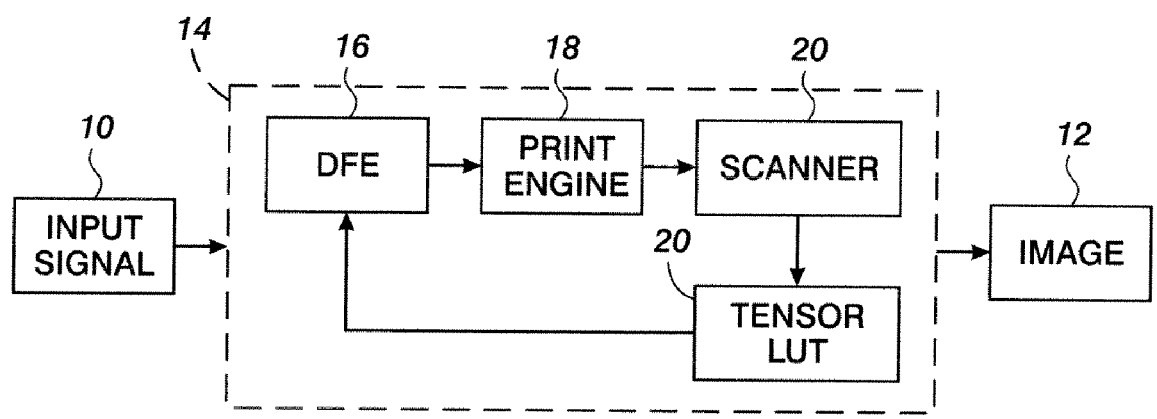
FIG. 1 is a block diagram of a printing apparatus including the subject embodiments.

In particular reference to FIG. 1, a printing apparatus in accordance with the present embodiments comprises a printer 14 that processes an input signal 10 into a print document 12. The printer is hardware conventional in that the input signal is processed by a digital front end 16 to communicate and aid a printing signal to print engine 18 which imparts a print image on a document. The subject engine is concerned primarily with color printing. A scanner or other color measuring device 20 detects if the output color is consistent with the desired color signaled by the input signal 10. A tensor LUT 22 relates the actual color output by the print engine to the intended color and comprises a feedback loop for adjusting the input signal at the digital front end so that the desired output color is accurate by the printer 14.

An $N^{th}$-order tensor in m-dimensional space is a mathematical object that has N indices and $m^N$ components and obeys certain transformation rules. Each index of a tensor ranges over the number of dimensions of space. Tensors are generalizations of scalars (that have no indices), vectors (that have exactly one index), and matrices (that have exactly two indices) to an arbitrary number of indices.

Mathematically, a $N^{th}$ order tensor is represented as $$\tau \in R^{S_1 \times S_2 \times \ldots S_N}$$

where is $\tau$ an order-N tensor and is the integer that describes the size of the $i^{th}$ dimension of $\tau$. It should be clear from the above definition that N=2 would make $\tau$ a matrix of size $S_1 \times S_2$.

Matrix decompositions such as the singular value decomposition (SVD) are ubiquitous in numerical analysis. The classical way of thinking about SVD is that it writes a M×N matrix A in terms of matrix factors U, D and V given as $$A_{M \times N} = U_{M \times N} V_{N \times N}$$

where D is diagonal and contains singular values $\sigma_i$'s; for a full-rank A $\sigma_i$'s are non-zero for i=min(M,N). Further, U and V contain orthonormal columns and rows respectively. In other words, the SVD built an orthonormal basis for the row/column space of A.

An alternate perspective on the SVD (or other matrix approximations) is that A is expressed as the minimal sum of rank-1 matrices:

$$A = \sigma_1 \cdot (u_1 \circ v_1) = \sigma_2 \cdot (u_2 \circ v_2) + \ldots + \sigma_r \cdot (u_r \circ v_r)$$

where $u_1$ is in $R^M$ and $v_1$ is in $R^N$ for all i=1,2, . . . r, and r<=min(M·N) is the rank of the matrix. The operator "o" denotes the outer product: thus the ij-th entry of the rank-1 matrix a o b is the product of the $i^{th}$ entry of a with the $j^{th}$ entry of b, that is (a o b)ij=$a_i b_j$.

Extending matrix decompositions such as the SVD to higher-order tensors however provides a significant mathematical challenge over conventional matrix processes. This is because familiar matrix concepts such as rank become ambiguous and more complicated. Tensor decompositions have been studied in tensor theory as parallel factor analysis. R. A. Harshman, "Foundations of the PARAFAC procedure: Model and Conditions for an explanatory multi-modal factor analysis", UCLA Working Papers in Phonetics, 1970. As with matrix decompositions, the goal of tensor decompositions is to write a tensor as a sum of rank-1 tensors. Consider for example, an M×N×P tensor A. Tensor A is expressed as a sum of rank-1 third order tensors; i.e., $$A = (u_1 \circ v_1 \circ w_1) + (u_2 \circ v_2 \circ w_2) + \ldots + (u_T \circ v_T \circ 2_T)$$

where $u_i$ is in $R^M$, $v_i$ is in $R^N$, $w_i$ is in $R^P$ for all i=1,2, . . . ,T. As before "o" denotes the outer product and (a o b o c)$_{ij}$=$a_i b_j c_k$.

Figure 2A:
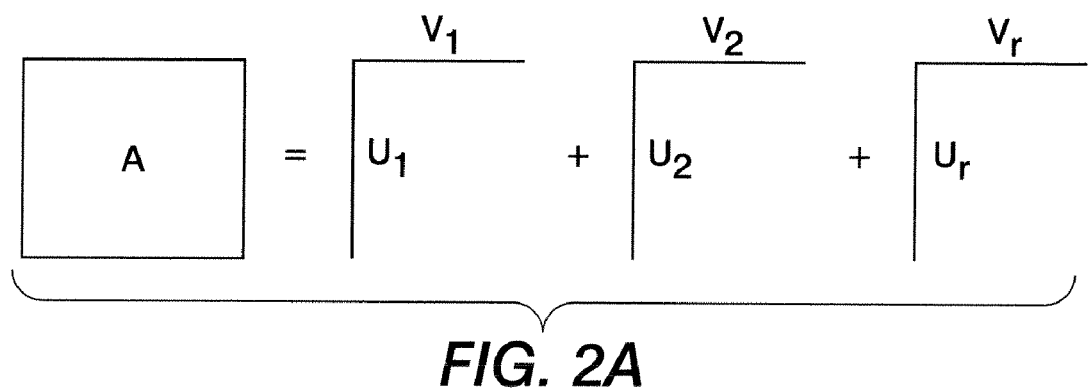
FIG. 2 is a conceptual visualization of representing order two and order three tensors by a sum of rank one outer products of vectors.
Figure 2B:
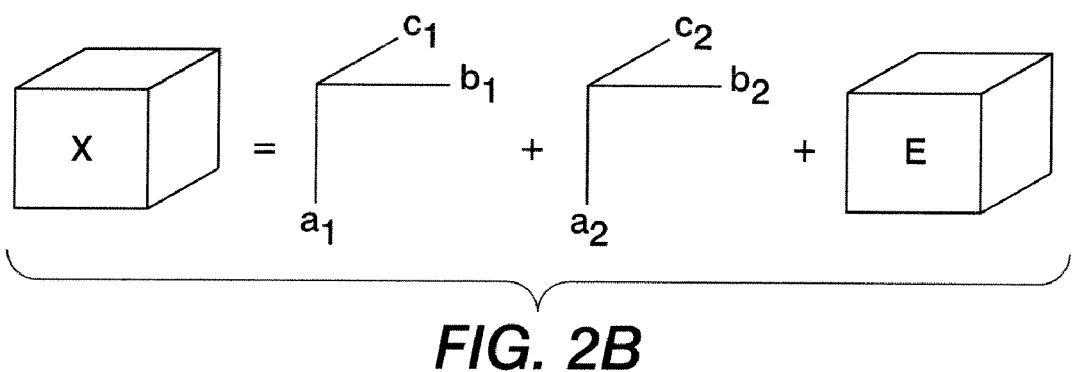

FIG. 2 shows a conceptual visualization in accordance with the above equations of approximating matrices and higher-order tensors as a sum of rank-1 tensors each of which is formed by taking outer products of vectors. Note, that an error term E is also shown for order –3 emphasizing that the decomposition is not necessarily a factorization.

The major difference of matrix decompositions with tensor decompositions is that there is no guarantee for the latter to exist for T<=M, i.e. in the case of order-n tensors, n>=3 an exact reconstruction cannot always be guaranteed. In practice hence, the following optimization problem is solved, $$(U, V, W) = \arg\min \left\| A - \sum_{i=1}^{T} u_i^O v_i^O w_i \right\|$$

where u, v, w are matrices formed by stacking respective vectors in columns and T<=M. Typically, alternate least squares type methods are employed in solving for the aforementioned optimization problem.

When an exact reconstruction is indeed possible, then U, V, W are called as the parallel factors of the tensor and hence the name "parallel factor analysis".

A multi-dimensional look-up table (LUTs) that maps n input variables to m output variables can be thought of as a collection of m LUTs, each of which is a map from n input variables to one output variable.

An n-dimensional LUT hence has n input variables or an n-dimensional input. FIG. 1 shows a visualization of an n-D LUT for the cases n=2, 3. As is shown in FIG. 1, the LUT nodes are designed to lie on a regular lattice. Define Ii to be a set of real-valued levels along the $i^{th}$ dimension. A regular lattice $L^n$ in n-dimensional space is defined as the set of all points x=[$x_1, x_2, \ldots, x_n$] whose $i^{th}$ component $x_i$ belongs to the set $I_i$. Mathematically, the lattice can be expressed as $$L^n = \{x \in R^n | x_i \in I_i, i=1,2, \ldots, n\}$$

If $S_i$ is the number of levels in $I_i$, the size of the lattice is $S_1 \times S_2 \times \ldots S_n$. The LUT is hence a map from the input lattice to al valued variables In fact, for ease of representation the input lattice may be thought of simply as a lattice of indices, i.e. each $x_i$ may take on a value i, where i=1,2, . . . n. In that setting, there is clearly equivalence between the $n^{th}$ order tensor definition and an n-dimensional LUT. In particular, an n-dimensional LUT with an input lattice of size $S_1 \times S_2 \times \ldots S_n$ may be interpreted as an order n tensor when the nodes of the lattice in the $i^{th}$ are simply integers ranging from 1,2, . . . $S_i$.

Figure 3A:
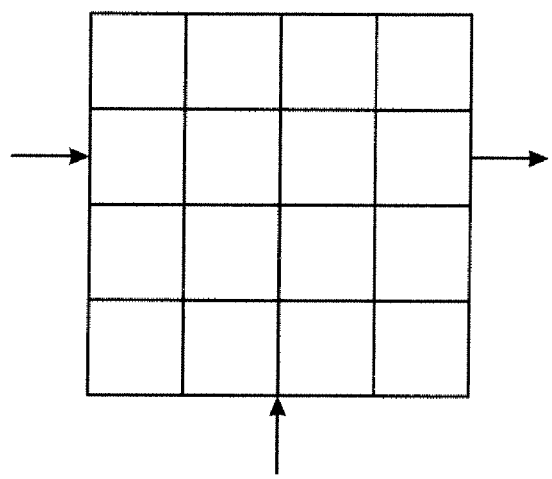
FIG. 3 is a representation of a two-dimensional, three-dimensional look-up table as a map from a regular lattice to a set of reals; and, FIG. 4 is an exemplar embodiment of the invention in constructing a three-dimensional CMY to Lab LUT.
Figure 3B:
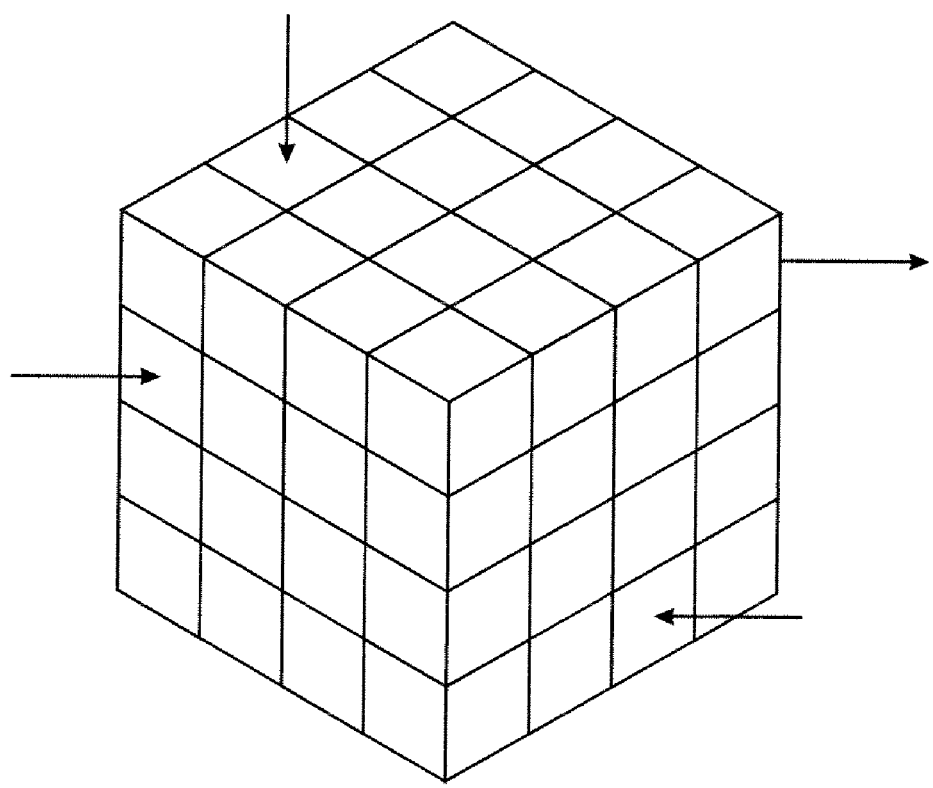

FIG. 3 is a representation of a two-dimensional, three-dimensional look-up table as a map from a regular lattice to the set of reals. This can be interpreted as a tensor if the nodes of the lattice in the $i^{th}$-dimension are simply integers from 1,2, . . . ,$S_i$.

As noted above, tensor decompositions are different from matrix decompositions in that an exact reconstruction by the parallel factors is not guaranteed. There is in fact another key difference which can be exploited for reduced effort LUT construction.

Consider a tensor in $R^{J \times J \times J}$, for T=J, solve for three parallel factors U, V, W each of size J×J and hence the total storage is $3*J^2$ as opposed to the original $J^3$ (compact representations will always be obtained as long as $T<J^2/3$). More generally, for T=J, an order n tensor the storage is $n*J^2$ vs $J^n$.

It should be clear that n-dimensional LUTs can be interpreted as order-n tensors. If one can decompose the LUT either exactly or to a small enough reconstruction error via the parallel factor analysis then one can construct LUTs with significantly reduced effort.

In particular, as highlighted above a three dimensional LUT for example can be constructed via $3*J^2$ measurements vs $J^3$. Note this number can be lessened even more in practice if T<J, i.e. if lower-rank parallel factors yield satisfactory approximations.

Figure 4:
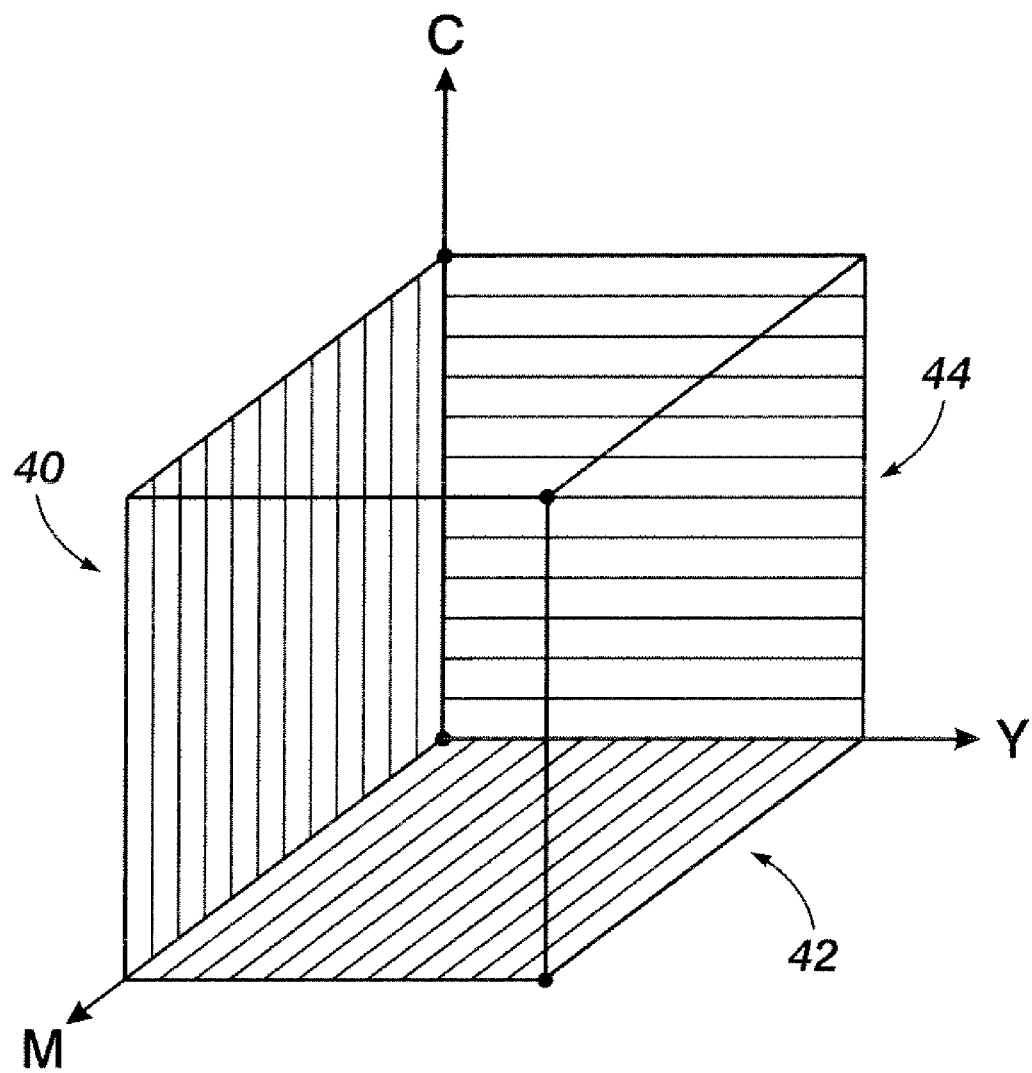

For example, FIG. 4 shows a CMY cube wherein the two dimensional planar regions as encompassed by the parallel factors of the LUT correspond to the CM 40, MY 42 and CY 44 planes, respectively.

Table 1 below quantifies for an example CMY LUT the average ΔE error when constructing a 17×17×17 LUT by measuring $17^3$ patches vs $3*17^2$ patches corresponding to the two dimensional planes. As is clear by this example, the average and max errors are both quite small. Table 1 also presents results with 3*(17×T) measurements—this is when a low-rank parallel factor approximation is used, results are shown for T=16, 14. Clearly, the errors are quite small even with T=14.

TABLE 1

| Measurement effort | Average ΔE | 95th percentile ΔE | Maximum ΔE |
|---|---|---|---|
| 3 * $17^2$ | 0.35 | 0.88 | 2.72 |
| 3 * (17 × 16) | 0.58 | 0.97 | 2.74 |
| 3 * (17 × 14) | 0.82 | 1.21 | 2.77 |

The word "printer" as used herein encompasses any apparatus, such as a digital copier, bookmaking machine, facsimile machine, multi-function machine, etc. which performs a print outputting function for any purpose.

It will be appreciated that various of the above-disclosed and other features and functions, or alternatives thereof, may be desirably combined into many other different systems or applications. Also that various presently unforeseen or unanticipated alternatives., modifications, variations or improvements therein may be subsequently made by those skilled in the art which are also intended to be encompassed by the following claims.

The invention claimed is:

1. An efficient method for characterizing a color device comprising:
   using a processor to perform the steps of:
   rendering a target set of patches with the device and measuring device response from the target set;
   constructing a look-up-table (LUT) from the target set and measured response;
   representing the LUT as a tensor; and
   employing tensor decompositions to obtain a new approximate representation of the LUT.

2. The method of claim 1 wherein employing tensor decomposition includes parallel factor analysis for compacting the tensor representation of the LUT.

3. The method of claim 2 including selectively constraining the tensor representation to derive parallel factors employed in the parallel factor analyses.

4. The method of claim 3 wherein the selectively constraining comprises applying orthogonality or non-negativity.

5. The method of claim 2 further including measuring a second set of target colors corresponding to two dimensional parallel factors/planar regions in an input color space of the device.

6. The method of claim 5 further including synthesizing a tensor generated LUT by employing tensor outer products based on the second set of target colors using the LD parallel factors.

7. A color printer comprising:
   an engine for printing a target set of patches with the printer;
   a sensor for measuring device response from the target set;
   a memory for compiling a LUT from the target set and the measured response; and
   a processor for representing the LUT as a tensor.

8. The printer of claim 7 wherein the processor further includes employing tensor decomposition for compacting the tensor representation of the LUT.

9. The method of claim 8 wherein the tensor decomposition includes parallel factor analysis to derive parallel factors employed in the parallel factor analyses.

10. The method of claim 9 wherein the parallel factors expressing the tensor representation comprise a sum of rank-1 third order tensors:

$$A = (u_1 \, o \, v_1 \, o \, w_1) + (u_2 \, o \, v_2 \, o \, w_2) + \ldots$$

for an M×N×P tensor A where $u_i$ is in $R^M$, $v_i$ is in $R^N$, $w_i$ is in $R^P$ for all i.

11. The method of claim 10 wherein the parallel factors are optimized as $$(U, V, W) = \arg\min \left\| A - \sum_{i=1}^{T} u_i^O v_i^O w_i \right\|$$

where u, v, w are matrices formed by stacking respective vectors in columns and T<=M.

12. The printer of claim 9 wherein the printer selectively constrains by applying orthogonality or non-negativity.

13. The printer of claim 8 wherein the sensor measures a second set of target colors corresponding to two dimensional parallel factors/planar regions in an input color space of the device.

14. The printer of claim 13 wherein the processor synthesizes a tensor generated LUT by employing tensor outer products based on the second set of target colors using the two dimensional parallel factors.

* * * * *